United States Patent [19]
Carter

[11] 3,931,679
[45] Jan. 13, 1976

[54] DENTAL PATIENT SIMULATOR
[75] Inventor: Donald F. Carter, South Pasadena, Calif.
[73] Assignee: Den-Tal-Ez Mfg., Co., West Des Moines, Iowa
[22] Filed: Nov. 5, 1973
[21] Appl. No.: 413,051

[52] U.S. Cl. ................................... 32/71; 35/17
[51] Int. Cl.² ........................................ G09B 19/00
[58] Field of Search .. 32/71, 32; 40/106.32, 106.43, 40/126 R; 35/17, 20

[56] References Cited
UNITED STATES PATENTS

| | | | |
|---|---|---|---|
| 2,103,058 | 12/1937 | Burtenshaw | 32/71 |
| 2,203,891 | 6/1940 | Burtenshaw | 32/71 |
| 2,574,838 | 11/1951 | Olson | 35/17 |
| 2,576,569 | 11/1951 | Burtenshaw | 32/71 |
| 3,520,060 | 7/1970 | Crabtree et al. | 32/71 |

OTHER PUBLICATIONS
"The Head of the Dental Class", Parade Mag., Nov. 5, 1972.

*Primary Examiner*—Louis G. Mancene
*Assistant Examiner*—J. Q. Lever
*Attorney, Agent, or Firm*—Rudolph L. Lowell

[57] ABSTRACT

The patient simulator provides a skull with a mandible and maxilla relatively arranged and supported for movement simulating that of a human mandible and maxilla, and having a skin covering with the natural appearance and "feel" of the human skin. The simulator additionally includes a resilient tongue, and soft palate or velum which with the skin covering defines the mouth cavity. With practice dentures releasably secured to the mandible and maxilla the dental student can practice on various tooth conditions under substantially normal working conditions.

5 Claims, 9 Drawing Figures

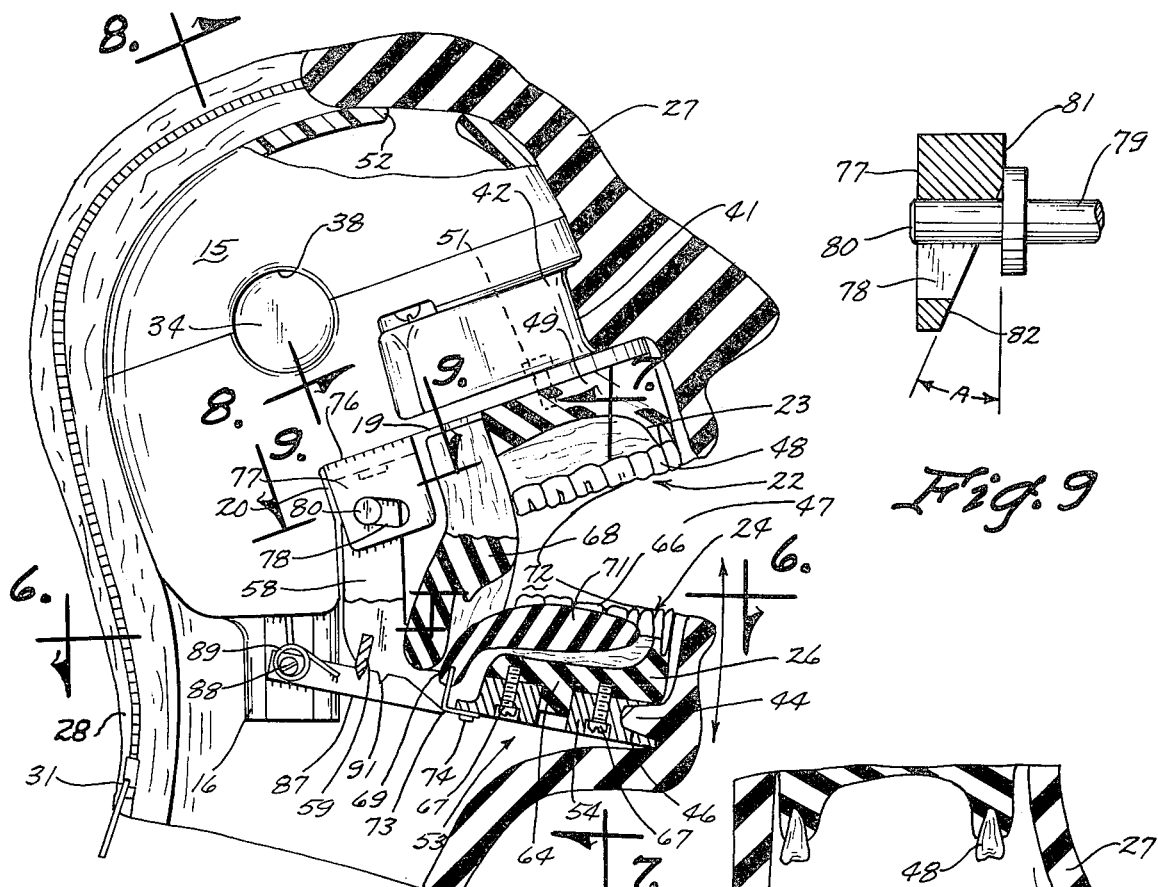
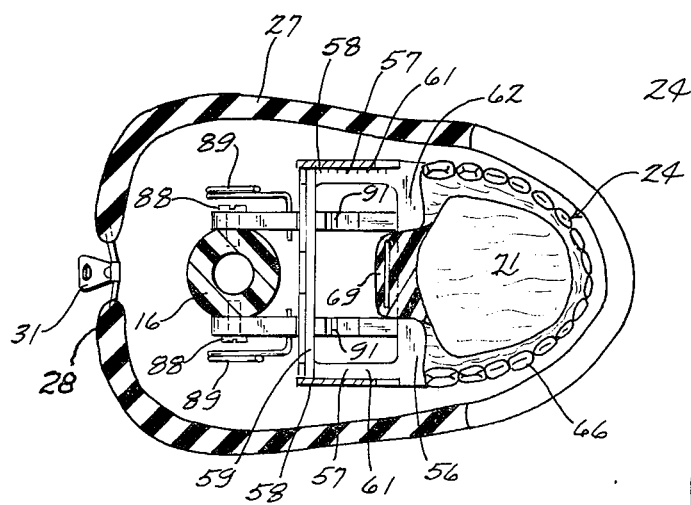
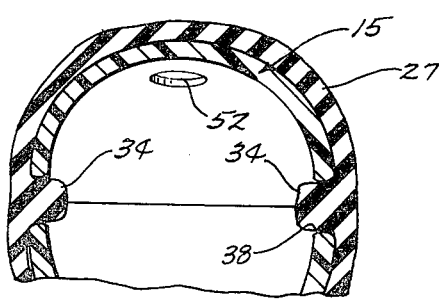
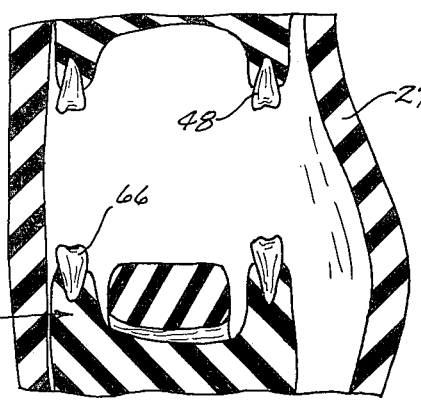
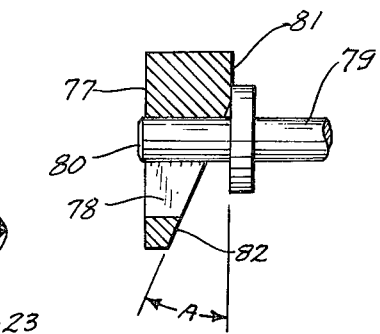

DENTAL PATIENT SIMULATOR

SUMMARY OF THE INVENTION

The patient simulator resembles a human head and is readily assembled to a body portion so that the complete assembly can be normally seated in a dental chair, with the head carried on the usual head rest. The skin covering lays against the outer surfaces of the dentures, and the resilient tongue member lays on the lower denture adjacent to and within the vertical confines of the teeth thereof. With the soft palate closing the throat end of the mouth, the available working space is limited to normal human conditions. Additionally, the cheek and lip portions of the skin covering and the tongue must be manually deflected, and retained deflected, to provide the necessary access to teeth being worked upon. As a result of this simulation of human skull and the facial characteristics, including the human simulation of the relative movement between the mandible and maxilla, the practice time of the dental student can be most advantageously planned and used under substantially normal working conditions without reliance upon practice patients.

BRIEF DESCRIPTION OF THE DRAWINGS

FIG. 5 is an enlarged sectional view taken on line 5—5 in FIG. 1;

FIG. 6 is a reduced sectional view as seen along line 6—6 in FIG. 5;

FIG. 7 is a fragmentary sectional view on line 7—7 in FIG. 5 showing the distension of one cheek from, and the proximity of the other cheek to opposite side portions of the lower jaw;

FIG. 8 is a reduced fragmentary sectional view on line 8—8 in FIG. 7; and

FIG. 9 is an enlarged fragmentary sectional view as seen along line 9—9 in FIG. 5.

DETAILED DESCRIPTION OF THE INVENTION

Figure 1:
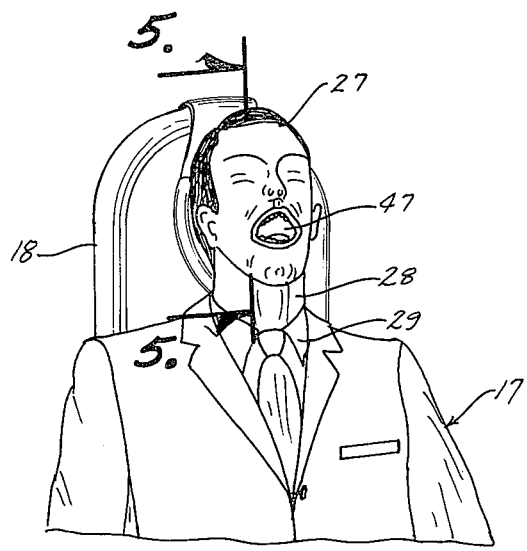
FIG. 1 is a perspective view of the patient simulator of this invention shown seated in a dental chair.
Figure 2:
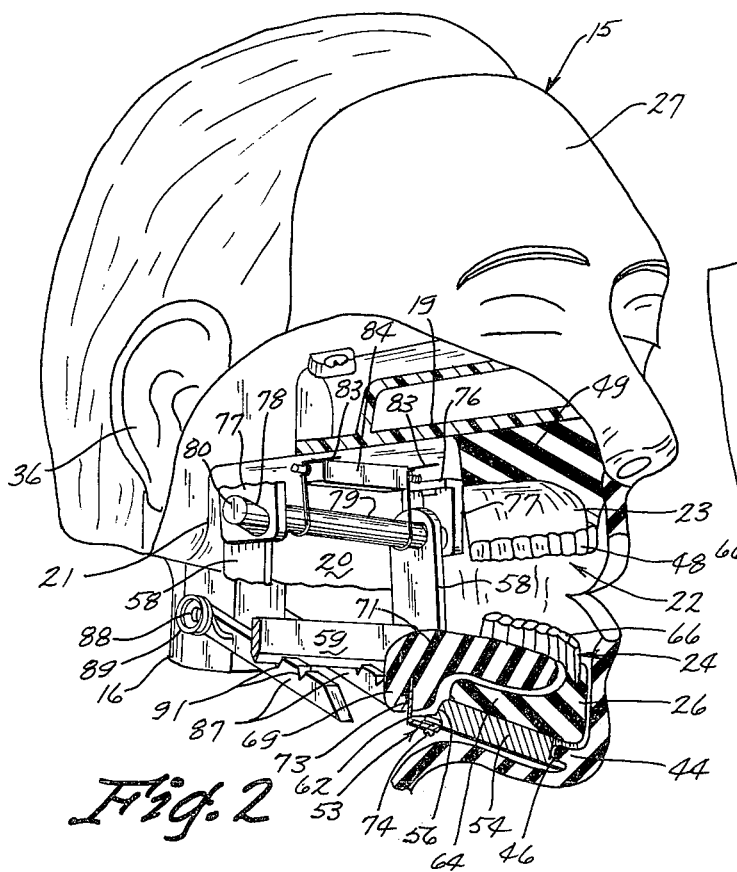
FIG. 2 is an enlarged perspective view of the patient simulator with parts broken away and other parts shown in section to more clearly show its construction.

With reference to FIG. 2 of the drawings, there is illustrated the simulation of a hollow human skull 15 which is formed of a suitable plastic material such as ABS styrene, nylon or a polyethylene having necessary strength and lightness requirements. The skull 15 includes a downwardly projected neck post 16 that fits within a mating socket (not shown) provided in a headless manikin 17 (FIG. 1), only the shoulder and arm portions of which are illustrated. Together the skull form 15 and manikin 17 simulate a complete human body which is adapted to be placed in a seated position within a dental chair 18 in all ways similar to a human body to simulate a dental patient.

Forwardly of the neck post 16 the skull 15 is formed with a cutaway section 20 defined in part by an upper wall 19 and a rear wall 21 (FIG. 2). Received within this cutaway section 20 and secured to the upper wall 19 is a fixed upper jaw maxilla 22 which includes a releasable upper practice denture 23. A lower jaw or mandible 24 is movably supported on the upper wall 19 at a position rearwardly of the upper denture 23 and includes a lower releasable practice denture 26 arranged opposite the upper denture 23.

The skull form 15 is completely enclosed within a skin covering 27 which is composed of an elastic material such as a suitable rubber or polyvinyl chloride composition and simulating the human skin and underlying tissues as to feel and thickness. This skin covering is tinted or colored in imitation of corresponding human skin portions.

The skin covering 27 is of a one piece construction and of a size and shape to fit over the skull form 15 for termination in a neck section 28, the lower portion of which, as shown in FIG. 1, extends within the collar of a shirt 29 worn by the manikin 17. A usual zipper closure 31 (FIGS. 5 and 6) for closing the skin covering 27 about the skull form 15 extends centrally of the back of the neck section 28 and upwardly and forwardly of the skull section to a position rearwardly of the forehead section of the covering 27. Thus, on opening of the zipper 31 the skin covering 27 may be spread apart for ready removal from the skull form.

To assure a mating fit of the skin covering 27 about the skull form, such covering is provided on its inner surface with a pair of opposed inwardly projected cylindrically shaped knobs or bosses 34 located adjacent simulated human ears 36 for projection within corresponding holes 38 in the skull form (FIGS. 5 and 8). Additionally, opposite the bridge portion of the simulated nose section on the covering 27, the covering is formed on its inner surface with an inwardly extended arcuate projection 41 that is received within an arcuate recess 42 formed in the skull 15. In the assembly of the skin covering 27 with the skull 15 the arcuate projection 41 is received in the recess 42 along with the cylindrical bosses 34 being inserted within the skull holes 38. It is to be also noted that the chin section of the skin covering 27 is formed with an inwardly extended arcuate projection 44 for reception within an associated arcuate recess 46 formed in the mandible 24. With the coacting portions on the skin covering 27 and skull 15 in mating engagement, the skin covering is readily located in a properly fitted relation with the skull to locate the mouth opening 47 relative to the jaws 22 and 24, and with this relation being maintained on closing of the zipper 31.

The upper practice denture 23 (FIGS. 2 and 5) includes usual artificial teeth 48 fixed in a suitable manner within a thermoplastic plate 49 having a flat upper surface adapted for full bearing engagement with the upper wall 19 of the skull recess or cutaway section 20. The upper denture 23 is secured to the wall 19 by means including a cap screw 51 insertable downwardly through the wall 19 for threadable engagement within the plate 49. To replace the upper denture 23 with another practice denture the locking screw 51 is accessible through a hole 52 (FIG. 5), formed in the top of the skull 15, by opening the zipper 31 and then stripping the skin covering 27 forwardly to expose the opening 52. The head member of the cap screw 51 is then manipulated by a usual socket wrench (not shown) adapted to be inserted within the skull 15 through the hole 52.

The lower jaw 24 (FIG. 2) includes a mounting bracket 53 that has a front shelf member 54 of a curved shape corresponding to the shape of the lower denture 26. Projected rearwardly from the rear wall 56 of the shelf 54 (FIGS. 2 and 6) are a pair of transversely spaced side members 57 which terminate in upright rear arm sections 58. Adjacent their lower ends, the upright arms 58 are connected together by a single transverse upright latch or pawl member 59. The side members 57 are of a generally angular shape in transverse cross section having horizontal leg portions 61 (FIG. 6) extended inwardly toward each other and connected at their forward ends by a horizontal ledge 62 which is integrally formed with the rear wall 56 of the front arcuate member 54. As best appears in FIG. 6, the vertical leg portions of the side members 57 are formed continuously with corresponding upright arms 58. It is to be noted that the front and side portions of the front shelf 54 are formed with the recess 46 which receives the arcuate projection 44 of the skin covering 27.

The lower practice denture 26 has a plate 64 (FIG. 5) fitted with artificial teeth 66. The plate 64 is in interlocked engagement with the top surface of the front shelf 54 of the mounting bracket 53 and the lower denture is secured to the shelf 54 by holding screws 67 projected upwardly through the shelf 54 for threaded engagement within the plate 64. The screws 67 are accessible for manipulation from the underside of the shelf 54 on removal of the skin covering 27.

Figure 4:
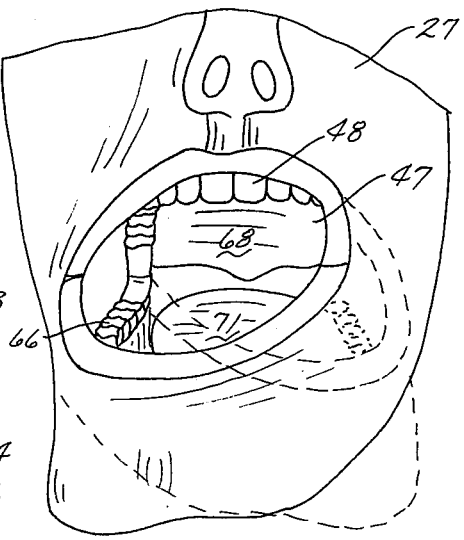
FIG. 4 is a fragmentary face view showing the lower jaw moved laterally in opposite directions to extreme positions relative to the upper jaw.

A soft palate or velum 68 (FIG. 5) is fixed to the upper wall 19 of the skull recess 20 at a position adjacent the rear side of the upper denture 23. From such upper wall the soft palate 68 (FIGS. 4 and 5) extends downwardly to a position rearwardly of the base 69 of a tongue member 71 and constitutes a rear closure for the mouth cavity 72. The tongue member 71 (FIGS. 2 and 4) is located between the artificial teeth 66 of the lower denture 26 with the base 69 thereof projected downwardly between the side members 57 at a position adjacent the rear wall 56 of the shelf 54. The tongue 71 is secured to the mounting bracket 53 by a clip member 73 of an angle shape having a verticle leg embedded within the tongue base 69 and a horizontal leg secured as by screws 74 to the underside of the horizontal ledge 62.

The lower jaw mounting bracket 53 is movably supported on the skull 15 by means including a pair of mounting blocks 76 (FIGS. 2 and 5) corresponding to the arms 58 and secured to the upper wall 19 of the recess 20 at positions rearwardly of the soft palate 68. Each mounting block 76 has a flat depending ear 77 adjacent an upright arm 58. The ears 77 are formed with transversely opposite elongated forwardly and downwardly extended slots 78 for receiving therein the projected end sections 80 of a shaft or rod 79 that interconnects the top ends of the upright arms 58.

As best appears in FIG. 9, the surface of an ear 77 facing an adjacent upright arm 58 is formed with a flat section 81 rearwardly of the slot 78 and with a forwardly and outwardly inclined section 82 over the remaining portion thereof. The upright arms 58 are yieldably held against the upper ends of the slots 78 by a pair of torsion springs 83 spaced longitudinally of the rod 79 between the arms 58 and anchored to the upper wall 19 by means including an anchor bar 84. It is thus seen that the lower jaw 26 is pivotally movable relative to the upper jaw 22 along with being laterally movable to opposite sides of the upper jaw on movement of one or the other of the projected ends 80 of the rod 79 longitudinally of an associated slot 78. This lateral movement is restricted to an included angle A formed between the surface of an upright arm 58 with the inclined surface section 82 of an adjacent ear 77. This pivotal and lateral movement of the lower jaw relative to the upper jaw is a substantial simulation of the relative movement of such jaws in a human skull.

For holding the lower jaw 24 in a pivotally moved position the neck post 16 (FIGS. 5 and 6) is provided with a pair of transversely opposite forwardly extended holding arms 87, the rear ends of which are separately pivoted on screws 88 arranged in axial alignment and threadably engageable within opposite sides of the neck post 16. The forward end of each arm 87 is continuously biased in an upward direction by a torsion spring 89 having one end anchored within the skull 15, and its opposite end extended transversely through a holding arm. The upper surfaces of the holding arms 87 are formed with longitudinally spaced notches 91 arranged opposite each other for selectively receiving the latch bar 59. The front ends of the top surfaces of the arms 87 are tapered downwardly and forwardly with the arms 87 being of a length such that such tapered surfaces are engageable with the underside of the horizontal ledge 62 of the mounting bracket 53.

The latch bar 59 is maintained in engagement within a selected pair of transversely opposite notches 91 by the torsion springs 89 on movement laterally of the lower jaw relative to the upper jaw 22 by virtue of the independent yieldable support of the holding arms 87 on the neck post 16. Thus, and referring to FIG. 2, should the lower jaw be laterally moved to the left, as viewed in FIGS. 2 and 4, the left end 80 of the rod 79 would remain at the upper end of its corresponding slot 78 while the right hand end 80 of the rod would be moved downwardly in its associated slot 78.

As a result of this downward movement, of the right hand end 80 of the rod 79, the right hand holding arm 87 would be pivotally moved downwardly a like amount while the latch bar 59 would remain within the selected notches 91. This lateral movement of the lower jaw 24 to the left to its full line position shown in FIG. 4, would be limited by the engagement of the inclined surface 82 on the ear 77 of the left hand mounting block 76 with the outer surface of the adjacent left hand arm 58. It will be understood that a similar movement of the rod 79 relative to the mounting blocks 76 would occur on lateral movement of the lower jaw to the right of the upper jaw 22 to the dotted line position therefor shown in FIG. 4. It is seen, therefore, that the movement of the lower jaw 24 relative to the upper jaw 22 simulates in all respects the corresponding relative movements of the human counterparts thereof.

Figure 3:
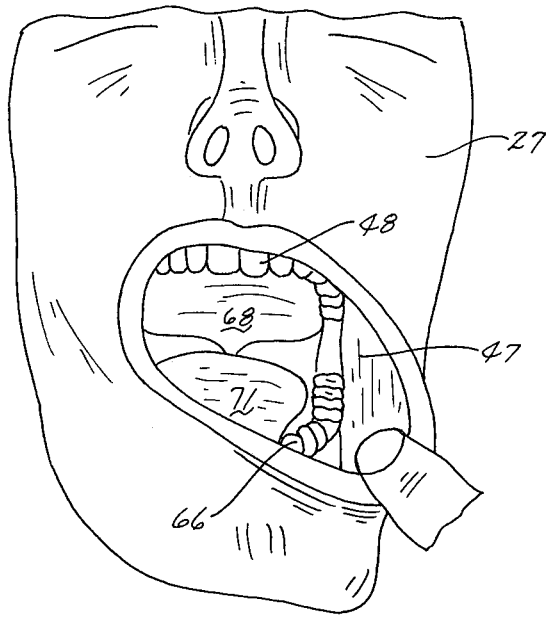
FIG. 3 is a fragmentary face view of the patient simulator showing one cheek manually deflected to provide access to the outer side of some of the teeth on the lower jaw.

As shown in FIG. 6, the lip and cheek sections of the skin covering 27 are adjacent to the outer surfaces of the teeth of the practice dentures 23 and 26. Thus, with the mouth in an open position access to the teeth adjacent a cheek section is obtained by manually deflecting a cheek section outwardly as illustrated for the right hand check section in FIGS. 3 and 7. With the soft palate 68 and tongue member 71 relatively arranged to simulate the human counterparts thereof, consideration must also be given to their positions when dental work is to be performed on the teeth 66 of the lower practice denture 26. It is seen, therefore, that access to the teeth 48 and 66 for dental operations as well as the working space available through the mouth and within the mouth cavity for performing such operations is limited and inhibited by simulated human skull characteristics to better prepare the practicing dentist for dental work on humans.

Although the invention has been described with respect to a preferred embodiment thereof it is to be understood that it is not to be so limited since changes and modifications can be made therein the full intended scope of the invention as defined by the appended claims.

I claim:

1. A dental practice device for simulating dental conditions of a dental patient, said device comprising:
   a. a simulated human head including a skull having an upper jaw fixed thereto,
   b. a movable lower jaw,
   c. means movably supporting the lower jaw on the skull for up and down pivotal movement toward and away from the upper jaw and for transverse movement relative to the upper jaw including means for releasably holding the lower jaw in a pivotally moved position and means providing for a transverse movement of the lower jaw in all pivotally moved positions thereof,
   d. practice dentures corresponding to and releasably secured to said upper and lower jaws, and
   e. a covering skin for said skull, upper jaw and lower jaw simulating the human skin and including a mouth portion, said skin forming with said jaws a mouth cavity to which access is had only through said mouth portion.

2. A dental practice device according to claim 1 wherein:
   a. said skull has a rearwardly located depending neck section and said lower jaw an upstanding rear section, and
   b. said releasable holding means includes a pair of pivoted arms arranged at opposite sides of said neck section and extended forwardly therefrom,
   c. means pivoting the rear ends of said pivoted arms on said neck section for independent pivoted movement about a common axis extended transversely of said neck section,
   d. coacting means on said pivoted arms and lower jaw for releasably locking the lower jaw in a pivotally moved position,
   e. said means for movably supporting the lower jaw for transverse movement including mounting means on said skull having a pair of transversely spaced elongated slots extended in a downward and forward direction,
   f. an elongated pivot means on said rear section having the ends thereof receivable in said slots, and
   g. means on said skull for yieldably urging said pivot means upwardly of said slots.

3. A dental practice device according to claim 2, wherein:
   a. said coacting means includes longitudinally spaced transversely opposite teeth portions in the upper surfaces of said pivoted arms,
   b. a transversely extended latch bar on said lower jaw adjacent said upstanding rear section selectively engageable with said teeth portions, and
   c. means on said skull for yieldably urging said pivoted arms into engagement with said latch bar.

4. A dental practice device according to claim 1 wherein:
   a. the practice denture for the lower jaw has a base portion with an open rear side and teeth projected upwardly from said base portion along the side and front edges thereof, and
   b. a flexible tongue member simulating a human tongue having a body portion with a downwardly projected rear portion secured to said lower jaw, so that said body portion extends forwardly through said open rear side and over said base portion within the vertical confines of said teeth.

5. A dental practice device according the claim 4 wherein:
   a. said upper denture has teeth thereon arranged in opposition to the teeth on said lower denture, and
   b. said covering skin has cheek portions and lip portions in contact engagement with the teeth on corresponding adjacent portions of said upper and lower dentures, whereby free access to the outer surfaces of said teeth is obstructed by said cheek and lip portions of the skin covering.

* * * * *